Figure 1:
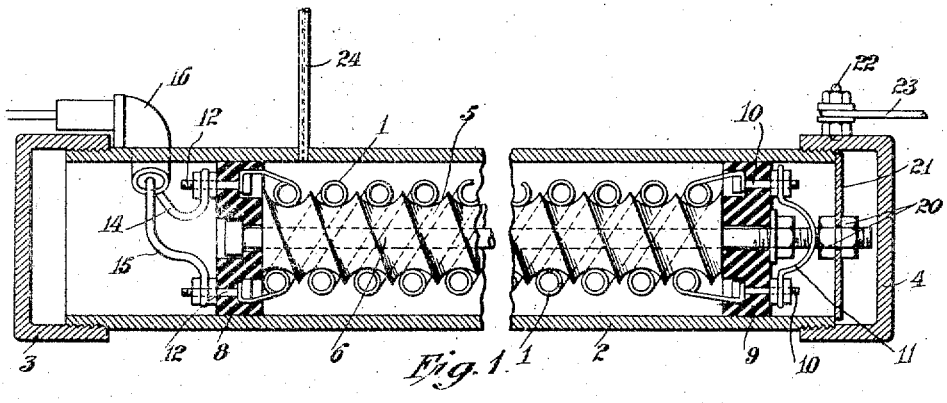

F. BOARDMAN.

ELECTRICAL HEATING DEVICE.

APPLICATION FILED FEB. 26, 1920.

Reissued Feb. 22, 1921. 15,047.

2 SHEETS—SHEET 1.

Attest:

Inventor:
Francis Boardman by

Atty

F. BOARDMAN.

ELECTRICAL HEATING DEVICE.

APPLICATION FILED FEB. 26, 1920.

Reissued Feb. 22, 1921. 15,047.

2 SHEETS—SHEET 2.

Attest:

Inventor:
Francis Boardman by

Atty

UNITED STATES PATENT OFFICE.

FRANCIS BOARDMAN, OF NEW YORK, N. Y.

ELECTRICAL HEATING DEVICE.

15,047. Specification of Reissued Letters Patent. Reissued Feb. 22, 1921.

Original application filed July 13, 1916, Serial No. 109,061. Renewed July 8, 1918, Serial No. 243,941 Original No. 1,294,607, dated February 18, 1919. Application for reissue filed February 26, 1920 Serial No. 361,559.

*To whom it may concern:*

Be it known that I, FRANCIS BOARDMAN, a citizen of the United States, residing at New York city, in the county of New York and State of New York, have invented new and useful Improvements in Electrical Heating Devices, of which the following is a specification.

This invention relates to electrical heating devices and consists in an improved construction and arrangement thereof designed to facilitate their installation under varying conditions of use and particularly adapted to be used for melting of snow and ice in the vicinity of railway switches, movable point frogs and similar locations where it is essential to prevent freezing and the accumulation of snow and ice. In their latter use the devices of my invention are particularly valuable in reducing the cost of maintaining the proper operation of railways during severe winter weather which, as is well known, is a considerable and costly factor.

An important feature of the present invention consists in providing separable and portable heating units which may readily be assembled in positions in such arrangement either multiple or series as required to proportion the resistance with relation to the voltage of the service available at the locality of their use. To this end the heating units of my invention are preferably constructed in the form of self-contained watertight units wherein the heating coil is inclosed within a sealed casing and provided with suitable exteriorly extended coupling means whereby they may be coupled up in multiple without interfering with the moisture proof closure of the individual units. In consequence, my improved units may be completed and tightly sealed at the point of manufacture and are adapted to produce the required resistance by merely coupling up in the multiple arrangement suited to their particular location.

Further features of my invention consists in the construction and organization of the parts as hereinafter shown whereby the heating coils are properly supported and insulated within the inclosing casing to permit of transporting the units without damage; in the arrangement wherein the terminal wires are so disposed that the cover may be removed to give access thereto without interfering with the connections and without danger of twisting the wires and also the provision of suitable ventilating means for the units permitting the air to escape under expansion.

The foregoing and other features and advantages will be understood by reference to the accompanying drawing wherein the reference numerals of this description are applied to like parts in the several views.

Figure 2:
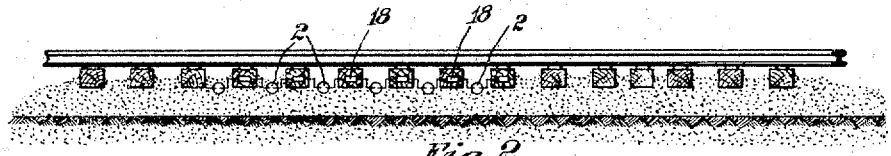
Figure 3:
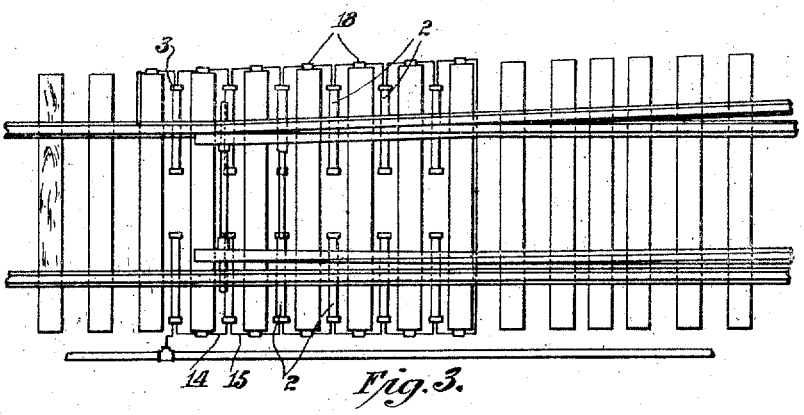
Figure 4:
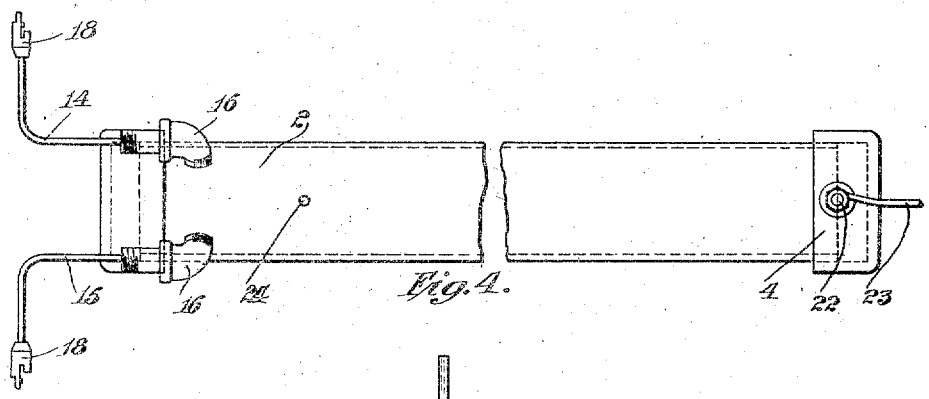
Figure 5:
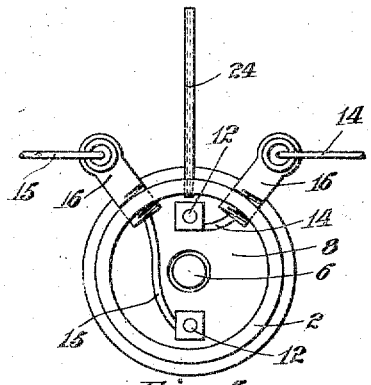
Figure 6:
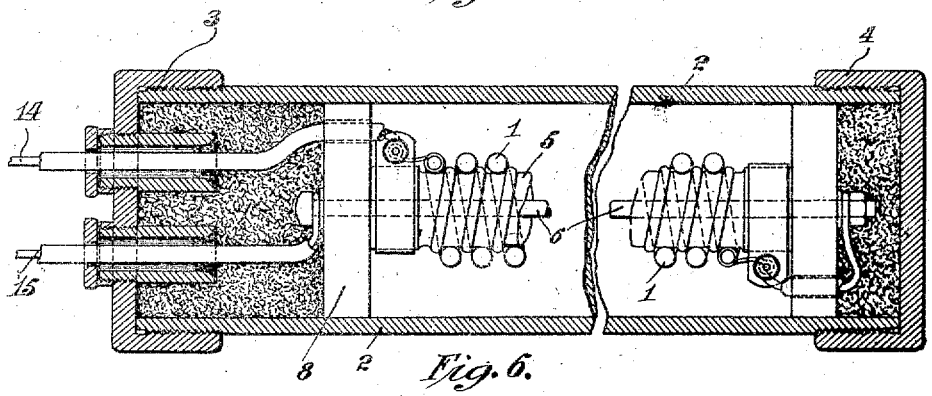

In the drawing Figure 1 is a longitudinal sectional view of a desirable embodiment of my invention. Fig. 2 is a view in side elevation illustrating a typical installation of my improved heating units and Fig. 3 is a plan view thereof. Fig. 4 is a plan view of the heating unit of Fig. 1. Fig. 5 is a view in end elevation with the cover removed and Fig. 6 is a view similar to Fig. 1 illustrating a modified construction of heating unit.

In the approved embodiment of my invention as shown in Figs. 1, 4 and 5 the heating coil or resistance 1 is inclosed within a suitable casing 2, which as here shown may desirably be a section of cylindrical pipe having its ends closed by screw caps or covers 3 and 4 threaded to the pipe. The heating coil 1 as shown is wound upon a corrugated supporting tube 5 of porcelain or other insulating material. This tube is supported upon a supporting bolt 6 passed therethrough and supported at its ends in spacer blocks 8 and 9 also of suitable insulating material. As here shown the heating coil is formed of two spiral coils or sections reversely wound within suitable grooves in the tube 5. At one end the sections of the coil are connected to terminal bolts 10—10 in the spacer block 9 and the circuit is closed, between these bolts by means of a connecting wire or spanner 11. At the other end the ends of the coil sections are connected to terminal bolts 12 supported in the spacer block 8. The terminal wires 14—15 are connected to the bolts 12—12 and are led into the casing through suitable pipe connections 16 as shown. Suitable clasp couplings or connections 18 are attached to the ends of the wires 14 and adapted to interlock with similar connectors of adjacent units.

As shown the bolt 6 is elongated at one end to receive the nuts 20—20 threaded thereon and a clamping plate 21 is fitted to the bolt and secured between the nuts 20 as shown. This clamping plate 21 is instrumental in securing the insulating tube, resistance and associated parts in position. To this end the plate is arranged to engage the end of the casing 2 and to be inclosed within the cap 4 whereby upon screwing the cap into the casing the parts will be secured to prevent longitudinal movement within the casing and consequent damage. This cap or cover 4 is provided with a terminal 22 for a ground connection 23.

A further feature of my invention consists in providing the heating units with a suitable vent 24 to permit the escape of air therefrom under the expansion caused by the heat. By means of the vent pipe shown, the pressure is relieved and danger of impairing the water-tightness of the units is overcome. The vent pipe may desirably extend upwardly merely sufficient to be above a possible water level.

As will be readily understood, the described heating units may be tightly closed at the place of manufacture; the pipe connections being filled with a suitable waterproof compound and the threaded connections being suitably waterproofed. At the place of installation the units may be coupled up in suitable multiple or series arrangement and placed in position for instance as shown in Figs. 2 and 3. In the approved installation there shown the units are merely placed in position between the ties and partially embedded in the ballast. As a result of this arrangement the units will operate to heat the ballast and ground beneath thereby taking the frost out of the ground so that the water can blow off and the heat and steam rising from the heated ballast and units will melt the snow and ice from the metal structure. The described manner of heating has been found to be far more effective than the heating of the track structure proper as heretofore proposed.

It will thus be seen that my improved units may conveniently be installed for no brackets or fixtures of any kind are required. Moreover, by reason of their being so detached my units do not seriously interfere with the ordinary track work, such as surfacing, lining, renewal of ties, etc. These units may be readily installed in the fall and removed in the spring and may readily be varied to suit any particular form of electric current and adjusted to changes in current available and furthermore, the heating area may be made larger or smaller at will by merely suitable spacing of the units. The heating current may be controlled by a switch at any desired location so that the heating means so afforded may be attended to by an employee having other duties such as signalman, agent or operator thereby avoiding calling out of trackmen whose only duty would be to operate these switches.

The improved form of sealed heating unit disclosed successfully permits of their being installed in the desirable manner and location described and by reason of the arrangement of the lead-in connections permits of obtaining access to the terminals by removing the cap 3 without disturbing the seal of the lead-in wires.

In Fig. 6 I have illustrated a modified form of sealed heating unit of my invention. As here shown a single coil resistance 1 is employed and is connected at one end by a connection 26 to the rod 6 through which the circuit is completed. The lead-in wires are here passed through the cap 3 and attached respectively to the coil 1 and the end of the rod 6. The ends of the casing are shown filled with asbestos fiber or other suitable insulating material.

While I have herein disclosed a desirable embodiment of my invention it will be understood that it is subject to various modifications without departing from my invention. It is therefore intended that all matter contained herein shall be interpreted as illustrative and not in a limiting sense.

Having described my invention I claim:—

1. A portable heating unit of the character described comprising a water-tight protective casing, spacing members arranged therein, an insulating coil support carried by the spacing members, a heating coil surrounding the coil support, exteriorly extending terminal wires connected with the heating coil and detachable coupling connections carried by the wires substantially as described.

2. A portable heating unit of the character described comprising an open ended cylindrical casing, spacing members fitted thereto, an insulating coil support carried by the spacing members, a heating coil surrounding the coil support, terminal connections on the front spacing member accessible through the casing openings, exteriorly extended terminal wires connected to the terminal and passed through apertures in the wall of the casing adjacent the front end thereof caps to seal the ends of the casing and means to secure the parts from longitudinal movement substantially as described.

3. A portable heating unit of the character described comprising an open ended cylindrical casing, spacing members fitted thereto, a supporting rod carried by the spacing members, an insulating tube carried on said rod and provided with a grooved peripheral surface, a heating coil fitted to the grooves, terminal connections on the front spacing member arranged to be accessible through the casing opening, exteriorly extended terminal wires connected to the terminals and passed through apertures in the wall of the casing adjacent the front end thereof, screw caps threaded to the ends of the casing, a clamping disk secured to the supporting rod and adapted to engage the end of the casing and to be secured in position by the cap for holding the parts against longitudinal movement, detachable coupling means on the terminal wires and said casing being sealed to make it water-tight and provided with a vent pipe to relieve the air pressure therein.

4. A heating device of the character described comprising a plurality of standardized portable heating units, each of said units consisting of a sealed protective casing having a resistance heating coil therein and said units being connected in plural series arrangement to provide the resistance value required for the circuit to which they are connected.

5. A heating device of the character described comprising a plurality of self-contained portable heating units, each of said units consisting of a sealed protective casing having a resistance heating coil therein and exteriorly extended connections thereto and said units being connected in plural series arrangement to provide the required resistance value for the circuit to which they are connected.

6. An electrical heating device for protecting railway switches and the like comprising a plurality of standardized portable heating units, each of said units consisting of a sealed protective casing having a resistance heating coil therein and said units being flexibly connected in plural series arrangement to provide the required resistance value for the circuit to which they are connected and to permit of installation between the railway ties, substantially as described.

7. An electrical heating system for protecting railway switches and the like comprising a plurality of separable heating units consisting of a sealed protective casing having a resistance heating element therein, said units being adapted for varied spacing distribution with relation to the devices to be protected and connected in plural series arrangement to provide the resistance value required for the circuit to which they are connected.

In testimony whereof, I have signed my name to this specification, in the presence of two subscribing witnesses.

FRANCIS BOARDMAN.

Witnesses:
W. C. HARRINGTON,
CHAS. W. SCHMIDT.